US012430037B2

(12) United States Patent
Kim et al.

(10) Patent No.: US 12,430,037 B2
(45) Date of Patent: Sep. 30, 2025

(54) ILLUSORY FREE DATA STORAGE SPACE IN DATA STORAGE DEVICES (71) Applicant: Sandisk Technologies, Inc., Milpitas, CA (US)

(72) Inventors: Kyoungil Kim, San Jose, CA (US); Hongmei Xie, Sunnyvale, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 43 days.

(21) Appl. No.: 18/354,310

(22) Filed: Jul. 18, 2023

(65) Prior Publication Data

US 2024/0272802 A1 Aug. 15, 2024

Related U.S. Application Data (60) Provisional application No. 63/444,803, filed on Feb. 10, 2023.

(51) Int. Cl.
*G06F 3/06* (2006.01)

(52) U.S. Cl.
CPC ............ *G06F 3/0616* (2013.01); *G06F 3/064* (2013.01); *G06F 3/0647* (2013.01); *G06F 3/0688* (2013.01)

(58) Field of Classification Search
CPC ...... G06F 3/0616; G06F 3/064; G06F 3/0647; G06F 3/0688
See application file for complete search history.

(56) References Cited

U.S. PATENT DOCUMENTS

| | | | | |
|---|---|---|---|---|
| 10,180,797 | B2 | 1/2019 | Grimsrud | |
| 11,194,712 | B2 | 12/2021 | Lee et al. | |
| 11,275,678 | B2 * | 3/2022 | Park | G06F 12/0246 |
| 2004/0196707 | A1 * | 10/2004 | Yoon | G06F 12/0246 |
| | | | | 711/E12.008 |
| 2008/0137501 | A1 * | 6/2008 | Ko | G11B 20/18 |
| | | | | 369/53.17 |
| 2010/0235605 | A1 * | 9/2010 | Perry | G06F 12/0246 |
| | | | | 711/170 |
| 2011/0271043 | A1 * | 11/2011 | Segal | G06F 12/0246 |
| | | | | 711/E12.001 |
| 2016/0232088 | A1 * | 8/2016 | Mohan | G06F 12/0246 |
| 2017/0213726 | A1 * | 7/2017 | Saly | C23C 16/45542 |
| 2018/0276123 | A1 | 9/2018 | Matsudaira | |

(Continued)

*Primary Examiner* — Aracelis Ruiz
(74) *Attorney, Agent, or Firm* — Morgan, Lewis & Bockius LLP (57) ABSTRACT

Data storage devices having the same capacity but with a different number of spare blocks and a different number of unusable blocks may cause device-to-device performance variance. This variance may be minimized by using illusory free blocks for relocation while using actual free blocks for other operations. In this regard, each data storage device having the same storage capacity may include a corresponding number of unusable blocks and a corresponding controller. Each controller may obtain a minimum number of blocks for supporting a predetermined storage characteristic. Each controller may calculate a respective number of spare blocks based on a respective number of unusable blocks, perform relocation for the respective data storage device based on the minimum number of blocks, and perform operations, which are not relocation, based on the minimum number of blocks and the respective number of spare blocks.

19 Claims, 3 Drawing Sheets

(56) References Cited

U.S. PATENT DOCUMENTS

| | | | |
|---|---|---|---|
| 2021/0173558 A1* | 6/2021 | Kashyap | G06N 20/00 |
| 2022/0083465 A1 | 3/2022 | Zhou et al. | |
| 2022/0261342 A1 | 8/2022 | Yang | |
| 2023/0325275 A1* | 10/2023 | Golvalkar | G06F 11/0751 |
| | | | 714/764 |

* cited by examiner

«ILLUSORY FREE DATA STORAGE SPACE IN DATA STORAGE DEVICES»

ILLUSORY FREE DATA STORAGE SPACE IN DATA STORAGE DEVICES

CROSS-REFERENCE TO RELATED APPLICATION

This application claims the benefit of U.S. Provisional Application No. 63/444,803, filed on Feb. 10, 2023, the entirety of which is incorporated herein by reference for all purposes.

BACKGROUND

A solid state drive (SSD) device may consist of several dies. Each die in an SSD device typically has the same number of total blocks. However, each die may have a different number of usable blocks and unusable blocks due to different yields during production. Accordingly, SSD devices having the same model and same capacity may have a different number of usable blocks and unusable blocks. This in turn causes a different number of additional spare blocks for each device. The additional spare blocks may be used as free blocks for storing data during runtime, thereby providing endurance benefit. Because each device may have a different number of free blocks used during runtime due to the different additional spare blocks, the performance may vary between devices. There is a need to keep the endurance benefit as well as provide even performance from device to device.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

The present description relates in general to data storage devices and methods, and more particularly to, for example, without limitation, providing illusory free data storage space in data storage devices. Techniques described herein may be used for minimizing device-to-device performance variance in storage devices.

Figure 1:
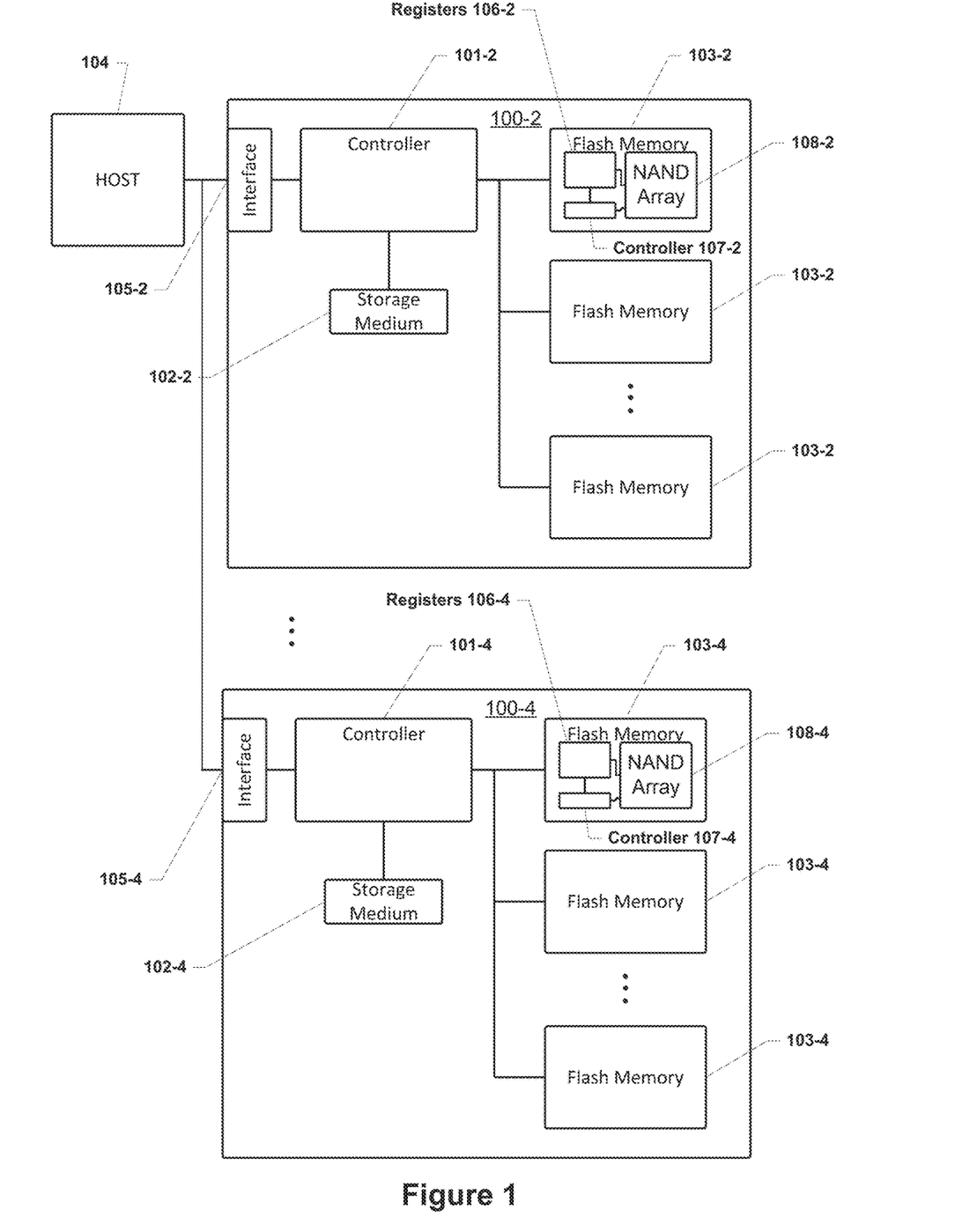
FIG. 1 is a block diagram illustrating components of an example data storage set and a host, according to one or more embodiments.

FIG. 1 is a block diagram illustrating components of an example data storage set and a host, according to aspects of the subject technology. A data storage set may include a plurality of data storage devices. A data storage device may be sometimes referred to as a storage device, a device, or a data storage system. As depicted in FIG. 1, in some aspects, a data storage system 100-2 (e.g., a solid-state drive (SSD)) includes a data storage controller 101-2, a storage medium 102-2, and a flash memory array including one or more flash memory 103-2. Similarly, a data storage system 100-4 (e.g., a solid-state drive (SSD)) includes a data storage controller 101-4, a storage medium 102-4, and a flash memory array including one or more flash memory 103-4. The controller 101-2 may use the storage medium 102-2 for temporary storage of data and information used to manage the data storage system 100-2. Similarly, the controller 101-4 may use the storage medium 102-4 for temporary storage of data and information used to manage the data storage system 100-4. The controller 101-2 and the controller 1-4 may each include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some aspects, the elements of the controller 101-2 and the controller 101-4 may each be integrated into a separate single chip. In other aspects, these elements may be separated on their own personal computer (PC) board. While FIG. 1 illustrates two data storage systems 100-2 and 100-4, the subject technology is not limited thereto, and the subject technology may include any number of data storage systems (e.g., one, two, three or more).

In some implementations, aspects of the subject disclosure may be implemented in the data storage system 100-2 and the data storage system 100-4. For example, aspects of the subject disclosure may be integrated with the function of the data storage controller 101-2, the function of the data storage controller 101-4, and/or may be implemented as separate components for use in conjunction with the data storage controllers.

The controller 101-2 and the controller 101-4 may each also include a processor that may be configured to execute code or instructions to perform the operations and functionality described herein, manage request flow and address mappings, and to perform calculations and generate commands. The processor of the controller 101-2 and the controller 101-4 may each be configured to monitor and/or control the operation of the components in the data storage controller 101-2 and the data storage controller 101-4, respectively. The processor may be a microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101-2, within the controller 101-4 and/or their respective processors. One or more sequences of instructions may be software stored and read from the storage medium 102-2, from the storage medium 102-4, the flash memory 103-2, the flash memory 103-4, or received from a host device 104 (e.g., via a host interface 105-2, via a host interface 105-4). ROM, the storage medium 102-2, the storage medium 102-4, the flash memory 103-2, the flash memory 103-4, represent examples of machine or computer readable media on which instructions/code executable by the controller 101-2, by the controller 102-4, and/or its processor may be stored. Machine or computer readable media may generally refer to any medium or media used to provide instructions to the controller 101-2, the controller 101-4, and/or their processor, including volatile media, such as dynamic memory used for the storage media 102-2, the storage media 102-4, or for buffers within the controller 101-2, within the controller 101-4, and non-volatile media, such as electronic media, optical media, and magnetic media.

In some aspects, the controller 101-2 and the controller 101-4 may each be configured to store data received from the host device 104 in the respective flash memory 103 in response to a write command from the host device 104. The controller 101-2 and the controller 101-4 may be further configured to read data stored in the respective flash memory 103 and to transfer the read data to the host device 104 in response to a read command from the host device 104. A host device 104 may be sometimes referred to as a host, a host system, or a host computer.

The host device 104 represents any device configured to be coupled to the data storage system 100-2 and the data storage system 100-4 and to store data in the data storage system 100-2 and the data storage system 100-4. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102-2 and the storage medium 102-4 each represent volatile memory used to temporarily store data and information used to manage the data storage system 100-2 and the data storage system 100-4, respectively. According to aspects of the subject technology, the storage medium 102-2 and the storage medium 102-4 are random access memory (RAM), such as double data rate (DDR) RAM. Other types of RAMs may be also used to implement the storage mediums. The memory may be implemented using a single RAM module or multiple RAM modules. While the storage medium 102-2 and the storage medium 102-4 are depicted as being distinct from the controllers 101-2 and 101-4, respectively, those skilled in the art will recognize that the storage mediums 102-2 and 102-4 may be incorporated into the respective controllers without departing from the scope of the subject technology. Alternatively, the storage medium may be a non-volatile memory, such as a magnetic disk, flash memory, peripheral SSD, and the like.

As further depicted in FIG. 1, the data storage system 100-2 and the data storage medium 100-4 may each also include the host interface 105-2 and the host interface 105-4, respectively. The host interfaces 105-2 and 105-4 may each be configured to be operably coupled (e.g., by wired or wireless connection) to the host device 104, to receive data from the host device 104 and to send data to the host device 104. The host interfaces 105-2 and 105-4 may each include electrical and physical connections, or a wireless connection, for operably coupling the host device 104 to the respective controllers 101-2 and 101-4 (e.g., via the I/O interface of the respective controllers). The host interfaces 105-2 and 105-2 may each be configured to communicate data, addresses, and control signals between the host device 104 and the respective controllers. Alternatively, the I/O interface of the controllers 101-2 and 101-4 may include and/or be combined with the host interfaces 105-2 and 105-4, respectively. The host interfaces 105-2 and 105-4 may each be configured to implement a standard interface, such as a small computer system interface (SCSI), a serial-attached SCSI (SAS), a fibre channel interface, a peripheral component interconnect express (PCIe), a serial advanced technology attachment (SATA), a universal serial bus (USB), or the like. The host interfaces 105-2 and 105-4 may each be configured to implement only one interface. Alternatively, the host interfaces 105-2 and 105-4 (and/or the I/O interface of the respective controllers) may be configured to implement multiple interfaces, which may be individually selectable using a configuration parameter selected by a user or programmed at the time of assembly. The host interfaces 105-2 and 105-4 may each include one or more buffers for buffering transmissions between the host device 104 and the respective controllers. The host interfaces 105-2 and 105-4 (or a front end of the respective controllers) may include a respective submission queue to receive commands from the host device 104. For input-output (I/O), the host device 104 may send commands, which may be received by the submission queue (e.g., a fixed size circular buffer space). In some aspects, the submission queues may be in the respective controllers. In some aspects, the host device 104 may have a submission queue. The host device 104 may trigger a doorbell register when commands are ready to be executed. The controllers 101-2 and 101-4 may then pick up entries from the submission queue in the order the commands are received, or in an order of priority.

The flash memory 103-2 and the flash memory 103-4 may each represent a non-volatile memory device for storing data. According to aspects of the subject technology, the flash memory may include, for example, a not-and (NAND) flash memory. The flash memory may include a single flash memory device or chip, or (as depicted in FIG. 1) may include multiple flash memory devices or chips arranged in multiple channels. The flash memory is not limited to any capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory is used to access one or more internal registers 106 and an internal flash controller (e.g., the flash controller 107-2 and the flash controller 107-4) for communication by external devices (e.g., the controllers 101-2 and 101-4, respectively). In some aspects, the registers 106-2 and 106-4 may each include address, command, and/or data registers, which internally retrieve and output the necessary data to and from a corresponding NAND memory cell array (e.g., array 108-2 and array 108-4, respectively). A NAND memory cell array may be sometimes referred to as a NAND array, a memory array, or a NAND. For example, a data register may include data to be stored in the memory array or data after a fetch from the memory array and may also be used for temporary data storage and/or act like a buffer. An address register may store the memory address from which data will be fetched to the host device 104 or the address to which data will be sent and stored. In some aspects, a command register is included to control parity, interrupt control, and the like. In some aspects, the internal flash controller is accessible via a control register to control the general behavior of the flash memory. The internal flash controller and/or the control register may control the number of stop bits, word length, receiver clock source, and may also control switching the addressing mode, paging control, coprocessor control, and the like.

In some aspects, the registers 106-2 and 106-4 may each also include a test register. The test register may be accessed by specific addresses and/or data combinations provided at the interface of the respective flash memory (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the respective flash memory (e.g., read levels) to dynamically vary how data is read from the memory cells of the memory arrays 108. The registers 106 may also include one or more data latches coupled to the flash memory 103.

It should be understood that in all cases data may not always be the result of a command received from the host 104 and/or returned to the host 104. In some aspects, the controller 101 may be configured to execute a read operation independent of the host 104 (e.g., to verify read levels or BER). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Figure 3:
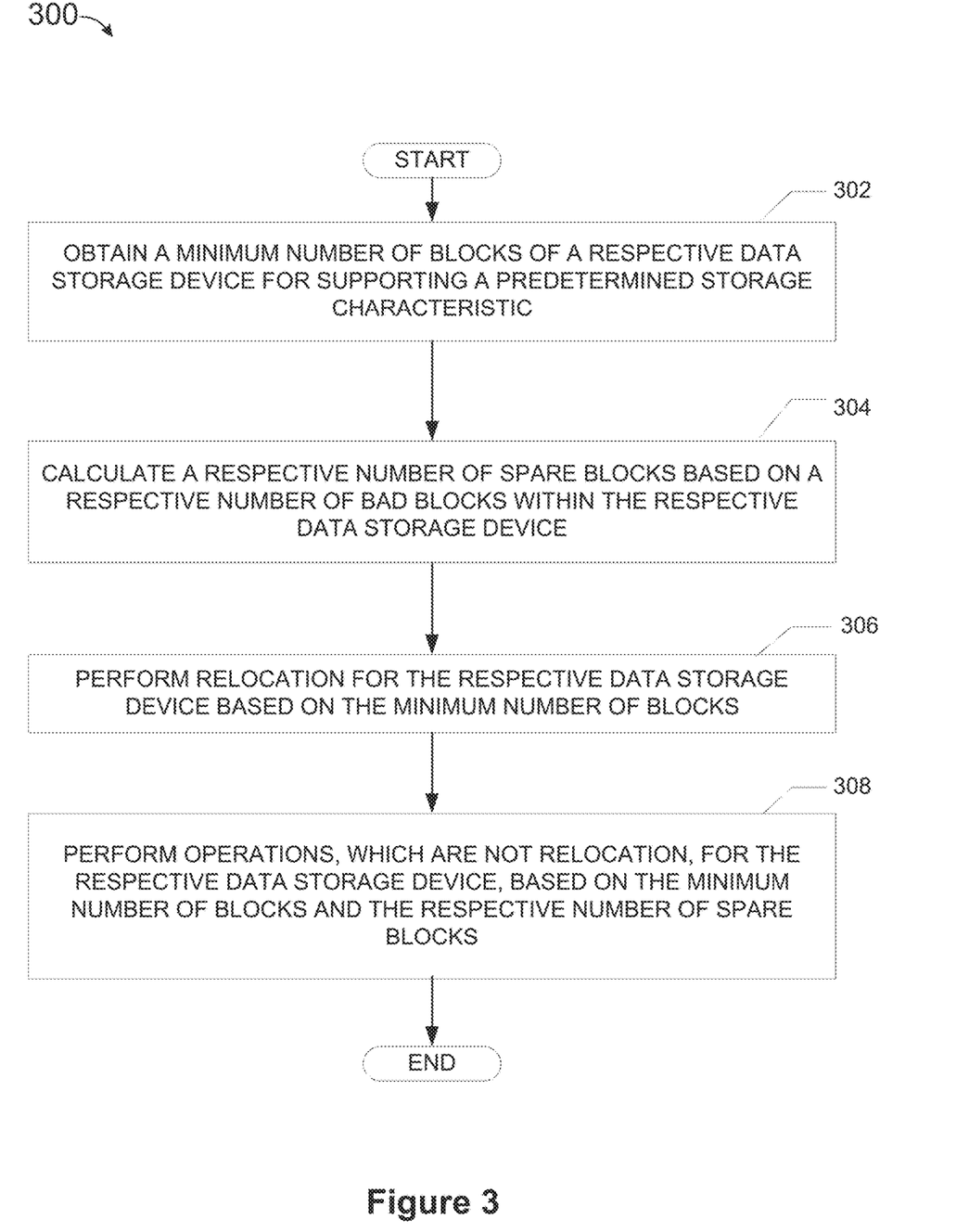
FIG. 3 is a flowchart illustrating an example process for supporting illusory free data storage space for minimizing device-to-device performance variance in storage devices, according to one or more embodiments.

The controller 101-2 and/or the controller 101-4 may each perform the operations identified in blocks 302-308. The controller 101-2 and/or the controller 101-4 may cause the operations identified in blocks 302-308 to occur, or the controller 101-2 and/or the controller 101-4 may provide instructions to cause or facilitate the controller 107-2 and/or the controller 107-4, respectively (and the registers 106-2 and 106-4, respectively) to perform operations identified in blocks 302-308.

Each device's performance may be dependent on the number of free blocks that can be used for storing data during runtime. If the number of free blocks is under some threshold, a relocation operation (sometimes referred to as garbage collection) may be triggered and this may cause a performance drop. This relocation operation may cause several NAND read/write operations to move the valid data from one block to another block. This may be in addition to basic operations to handle the host commands. So having a lower number of free blocks may trigger the relocation faster and more frequently and eventually may have lower performance. In other words, having higher number of free blocks may have higher performance.

In some instances, if the additional spare blocks that are calculated based on factory bad blocks are used as free blocks, then it may make the performance variance from device to device due to the different number of free blocks. But if they are not used as free blocks, the endurance benefit may be lost. Accordingly, some aspects use illusory free space (sometimes referred to as fake free space) to provide both endurance and to reduce performance variance as further described below. In some aspects, even though each device may have a different number of additional spare blocks, the spare blocks may be used as free blocks to keep the endurance benefit, all devices may function as if they have the same number of free blocks, thereby avoiding performance variance. Because the performance variance may be dependent on when and how frequently the relocation is triggered, faking free space may be only needed when calculating the free blocks to check the condition for triggering the relocation operation. By doing this, every device can have the same timing to trigger the relocation operation for the same host workload even though they have the different number of free blocks in reality.

Some aspects may perform the following steps for faking free space. Some aspects may calculate the number of additional spare blocks based on a bad block count for the device. When calculating the free space to trigger the relocation operation, some aspects may subtract the number of additional spare blocks from the real free space. For example, free blocks may be computed by subtracting additional spare blocks from the free blocks. Some aspects may use the real free space in cases other than relocation, so that the additional spare blocks can be used and cycled with other free blocks.

Figure 2:
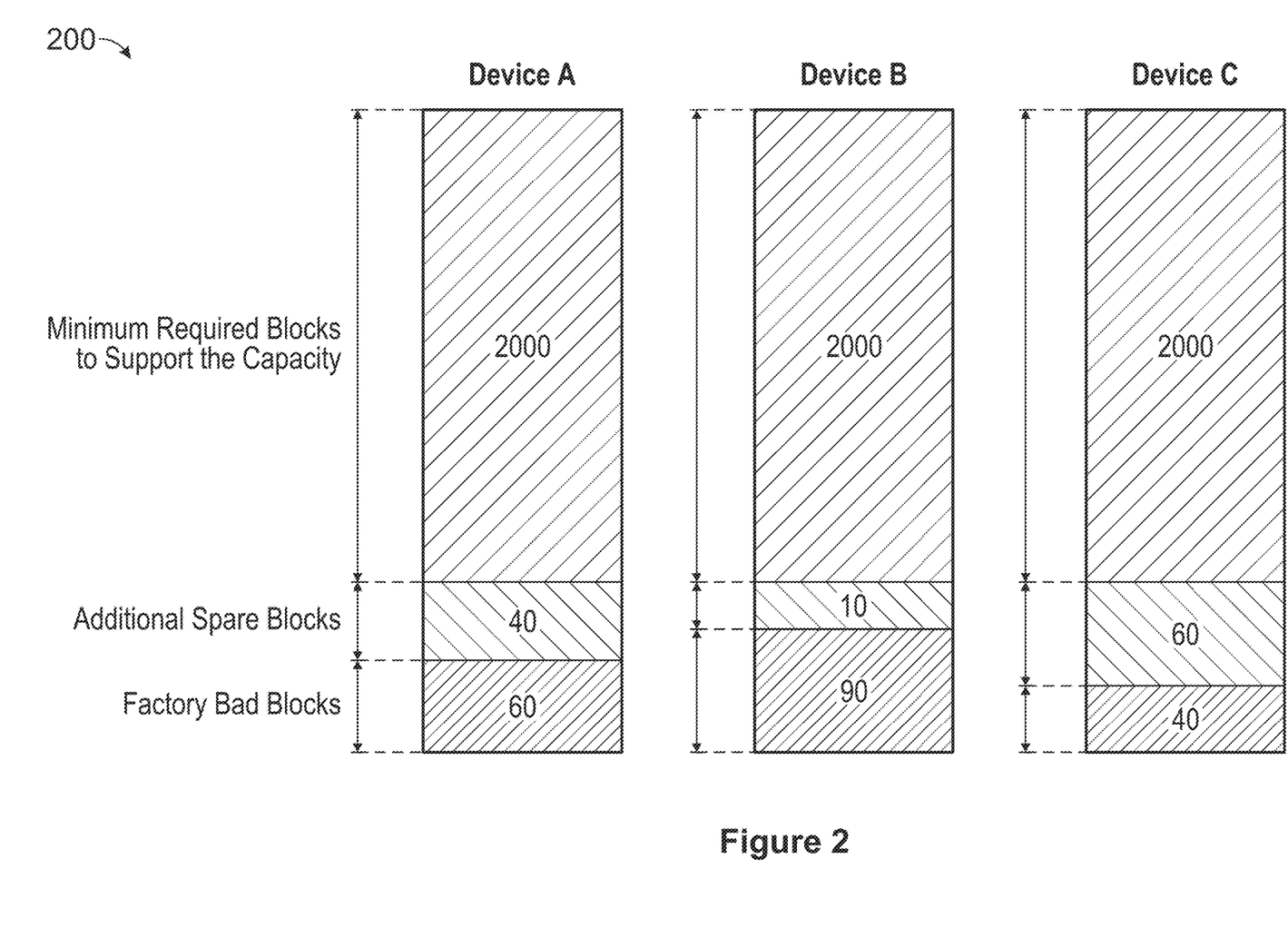
FIG. 2 shows a schematic diagram of an example set of data storage devices, according to one or more embodiments.

FIG. 2 shows a schematic diagram of an example set of data storage devices, according to one or more embodiments. An example data storage set 200 shows three data storage devices A, B and C having a same capacity. However, the devices A, B and C have different number of bad blocks 60, 90, and 40, respectively. Bad blocks may be sometimes referred to as factory bad blocks. The devices may have same minimum required blocks to support the capacity (2,000 in this example). The minimum required blocks of each of the devices A, B and C may have a minimum number of blocks (2,000 in this example) of the respective data storage device (e.g., device A, device B or device C, respectively) for supporting a predetermined storage characteristic. Additional spare blocks for devices A, B and C are, for example, 40, 10 and 60, respectively. The additional spare blocks may be sometimes referred to as spare blocks.

In one or more examples, usable blocks may include the minimum required blocks and the spare blocks. In one or more examples, unusable blocks may include the bad blocks (e.g., not usable for writing or programming data). In one or more examples, usable blocks may include used blocks (e.g., blocks containing data written or programmed) and free blocks (e.g., blocks ready to be written or programmed with data).

In some aspects, the device A may have 2,040 free blocks, the device B may have 2,010 free blocks and the device C may have 2,060 free blocks, at an initial time, and the free blocks may be used and cycled during runtime. But when checking for the condition to trigger relocation, in some aspects, the three devices may be deemed to have the same free blocks (2,000) due to the faking free space mechanism.

The following table shows results for experiments using an input/output (I/O) subsystem measurement and characterization tool for single and clustered systems (sometimes referred to as an Iometer test) with random 4 Kilobyte workload after precondition (full capacity write). The performance result with fake free space (column C) was similar to the result having maximum factory bad blocks (column A).

|  | Column A: Maximum factory bad blocks (0 additional spare blocks) | Column B: Normal factory bad blocks (49 additional spare blocks) | Column C: Fake free space with normal factory bad blocks (49 additional spare blocks) |
|---|---|---|---|
| Write Performance (Megabytes/second) | 54.83 | 92.46 | 54.81 |

In this way, the endurance benefit may be kept while providing even performance across devices. Negligible variance in I/O performance numbers between different devices is a desired behavior for SSD devices for large scale data storage applications, such as boot drives for cloud storage. Moreover, this benefit is achieved with a simple software logic without any extra cost to the physical device's endurance characteristic.

It may be instructive to describe the structures shown in FIGS. 1 and 2, with respect to FIG. 3, a flowchart illustrating an example process 300 for supporting illusory free data storage space for minimizing device-to-device performance variance in storage devices, according to one or more embodiments. One or more blocks of FIG. 3 may be executed by a computing system (including, e.g., a controller of a flash memory, a data storage controller of a data storage system or a solid state storage device (SSD), a processor, or the like). Example of a computing system or a controller may be the controller 101-2 or the controller 101-4. Similarly, a non-transitory machine-readable medium may include machine-executable instructions thereon that, when executed by a computer or machine, perform the blocks of FIG. 3. The steps of process 300 may be implemented as hardware, firmware, software, or a combination thereof. For example, a data storage device (e.g., the storage device 100-2 or the storage device 100-4) includes a submission queue for receiving host commands from a host system. In some aspects, a data storage set may include a plurality of data storage devices (e.g., data storage devices 100-2 and 100-4 shown in FIG. 1; devices A, B and C, shown in FIG. 2). Each data storage device may have a same storage capacity, and each data storage device may include a corresponding number of bad blocks. For ease of explanation, the following description may be provided from the perspective of one controller (e.g., the controller 101-2, may be a controller as part of device A), but the operations may be performed by each controller corresponding to a respective data storage device (e.g., the controller 101-2 for the device 100-2 and the controller 101-4 for the device 100-4, shown in FIG. 1, or the controllers for the devices A, B and C shown in FIG. 2).

The controller 101-2 may be configured to obtain (302) a minimum number of blocks (e.g., 2000 in FIG. 2) of the respective data storage device for supporting a predetermined storage characteristic. The controller 101-2 may also be configured to calculate (304) a respective number of spare blocks based on a respective number of bad blocks within the respective data storage device. The controller 101-2 may also be configured to perform (306) relocation for the respective data storage device based on the minimum number of blocks. The controller 101-2 may also be configured to perform (308) operations, which are not relocation, for the respective data storage device, based on the minimum number of blocks and the respective number of spare blocks.

In some aspects, each controller may be configured to determine a respective number of illusory free blocks (sometimes referred to as fake free blocks) within the respective data storage device. In accordance with a determination that the respective number of illusory free blocks meets a respective threshold, each controller may be configured to trigger the relocation for the respective data storage device. The blocks of the respective data storage device for supporting the predetermined storage characteristic may be configured to be used for data storage. The illusory free blocks may be configured to be used for data storage. The spare blocks may be configured to be used for data storage. The bad blocks may not be usable for data storage. The illusory free blocks may exclude the spare blocks and the bad blocks. The illusory free blocks may be based on the blocks of the respective data storage device for supporting the predetermined storage characteristic.

In some aspects, the illusory free blocks within the respective data storage device may include actual free blocks within the blocks of the respective data storage device for supporting the predetermined storage characteristic and may exclude actual free blocks within the spare blocks of the respective data storage device. In one or more examples, actual free blocks are blocks that can be written or programmed. In one or more examples, actual free blocks are blocks for writing data. Actual free blocks may be within the blocks for supporting the predetermined storage characteristic (or the minimum required blocks in FIG. 2) and/or the spare blocks. In reference to FIG. 2, for the device A, the illusory free blocks may include actual free blocks in the 2,000 blocks but exclude actual free blocks within the 40 spare blocks; for the device B, the illusory free blocks may include actual free blocks in the 2,000 blocks but exclude the actual free blocks within the 10 spare blocks; and for the device C, the illusory free blocks may include blocks in the 2,000 blocks but exclude the actual free blocks within the 60 spare blocks.

In some aspects, each controller may be configured to determine the respective number of illusory free blocks within the respective data storage device by subtracting the respective number of spare blocks within the respective data storage device from a respective number of actual free blocks within the respective data storage device. The actual free blocks within the respective data storage device may include actual free blocks within the blocks of the respective data storage device for supporting the predetermined storage characteristic and may include actual free blocks within the spare blocks of the respective data storage device. For example, in reference to FIG. 2, for the device A, the actual free blocks may include blocks within the 2,000 blocks or the 40 spare blocks; for the device B, the actual free blocks may include blocks within the 2,000 blocks or the 10 spare blocks; and for the device C, the actual free blocks may include blocks within the 2,000 blocks or the 60 spare blocks.

In some aspects, each controller may be configured to perform the operations, which are not relocation, for the respective data storage device using actual free blocks within the respective data storage device. The actual free blocks within the respective data storage device may include actual free blocks within the blocks of the respective data storage device for supporting the predetermined storage characteristic and may include actual free blocks within the spare blocks of the respective data storage device. For example, as described above, in reference to FIG. 2, for the device A, the actual free blocks may include blocks within the 2,000 blocks or the 40 spare blocks; for the device B, the actual free blocks may include blocks within the 2,000 blocks or the 10 spare blocks; and for the device C, the actual free blocks may include blocks within the 2,000 blocks or the 60 spare blocks.

In some aspects, each controller may be configured to determine the respective number of spare blocks within the respective data storage device by subtracting the minimum number of blocks of the respective data storage device and the respective number of bad blocks within the respective data storage device from a respective number of total blocks within the respective data storage device. The respective number of total blocks within the respective data storage device may be same as a respective number of total blocks within each of other data storage devices of the plurality of data storage devices. For example, in FIG. 2, device A's controller may determine its additional spar blocks to be 40 by subtracting 2,000 plus 60 from 2,100, device B's controller may determine its additional spar blocks to be 10 by subtracting 2,000 plus 90 from 2,100, and device C's controller may determine its additional spar blocks to be 60 by subtracting 2,000 plus 40 from 2,100.

In some aspects, the minimum number of blocks of the respective data storage device for supporting the predetermined storage characteristic may be same as a minimum number of blocks of each of other data storage devices of the plurality of data storage devices for supporting the predetermined storage characteristic. For example, in FIG. 2, devices A, B and C, each have a minimum required blocks of 2,000.

In some aspects, at least one data storage device of the plurality of data storage devices may include a different number of bad blocks when compared to another data storage device of the plurality of data storage devices. For example, in FIG. 2, devices A, B and C may each have different number of bad blocks.

In some aspects, the predetermined storage characteristic may be storage capacity for each data storage device. For example, in FIG. 2, the total storage capacity for each device is 2,100 blocks.

In some aspects, each data storage device may have a same number of dies and may be of a same type of memory. For example, the devices A, B and C may each have a same number of dies (e.g., 4), and may be of a same type of memory (single-level cell, quad-level cells).

In some aspects, the respective number of bad blocks within the respective data storage device corresponds to a number of bad blocks across all dies within the respective data storage device. For example, the devices A, B and C may each include a number of dies. The number of bad blocks for each data storage device includes the number of bad blocks across all the dies for that data storage device. The number of bad blocks may be unevenly distributed across the number of dies for each data storage device.

In some aspects, the system may include a host interface (e.g., the host interface 105-2) for coupling the plurality of data storage devices to a host system (e.g., the host 104). Each data storage device may be configured to store data corresponding to a same workload received from the host system.

In another aspect, a data storage device is provided. The data storage device may use illusory free data storage space for minimizing performance variance amongst data storage devices in a system. The data storage device may include one or more flash memories having a number of allocated blocks for supporting a storage characteristic. The data storage device may also include a controller. The controller may be configured to determine a count of spare blocks within the one or more flash memories based on a count of total blocks within the one or more flash memories and a count of bad blocks within the one or more flash memories. The controller may also be configured to determine a count of total free blocks within the one or more flash memories. The total free blocks may include free blocks within the allocated blocks and free blocks within the spare blocks. The controller may also be configured to determine a count of illusory free blocks within the one or more flash memories. The illusory free blocks may include the free blocks within the allocated blocks and exclude the free blocks within the spare blocks. The controller may also be configured to perform relocation for the one or more flash memories using the count of illusory free blocks within the one or more flash memories. The controller may also be configured to perform operations, which is not relocation, for the one or more flash memories using the count of total free blocks within the one or more flash memories. The allocated blocks and the spare blocks may be usable for writing data, and the bad blocks may be unusable for writing data.

In some aspects, the allocated blocks may represent a minimum number of blocks required to support the storage characteristic. In one or more examples, a storage capacity may be a predetermined storage capacity. In one or more examples, a storage characteristic may be a predetermined storage characteristic.

Various examples of aspects of the disclosure are described below. These are provided as examples, and do not limit the subject technology.

One or more aspects of the subject technology provide a data storage set that may include a plurality of data storage devices. Each data storage device may have a same storage capacity, and each data storage device may include a corresponding number of bad blocks. The data storage set may also include a plurality of controllers, each controller corresponding to a respective data storage device. Each controller may be configured to obtain a minimum number of blocks of the respective data storage device for supporting a predetermined storage characteristic. Each controller may also be configured to calculate a respective number of spare blocks based on a respective number of bad blocks within the respective data storage device. Each controller may also be configured to perform relocation for the respective data storage device based on the minimum number of blocks. Each controller may also be configured to perform operations, which are not relocation, for the respective data storage device, based on the minimum number of blocks and the respective number of spare blocks.

In some aspects, each controller may be configured to determine a respective number of illusory free blocks (sometimes referred to as fake free blocks) within the respective data storage device. In accordance with a determination that the respective number of illusory free blocks meets a respective threshold, each controller may be configured to trigger the relocation for the respective data storage device. The blocks of the respective data storage device for supporting the predetermined storage characteristic may be configured to be used for data storage. The illusory free blocks may be configured to be used for data storage. The spare blocks may be configured to be used for data storage. The bad blocks may not be usable for data storage. The illusory free blocks may exclude the spare blocks and the bad blocks. The illusory free blocks may be based on the blocks of the respective data storage device for supporting the predetermined storage characteristic.

In some aspects, the illusory free blocks within the respective data storage device may include actual free blocks within the blocks of the respective data storage device for supporting the predetermined storage characteristic and may exclude actual free blocks within the spare blocks of the respective data storage device.

In some aspects, each controller may be configured to determine the respective number of illusory free blocks within the respective data storage device by subtracting the respective number of spare blocks within the respective data storage device from a respective number of actual free blocks within the respective data storage device. The actual free blocks within the respective data storage device may include actual free blocks within the blocks of the respective data storage device for supporting the predetermined storage characteristic and may include actual free blocks within the spare blocks of the respective data storage device.

In some aspects, each controller may be configured to perform the operations, which are not relocation, for the respective data storage device using actual free blocks within the respective data storage device. The actual free blocks within the respective data storage device may include actual free blocks within the blocks of the respective data storage device for supporting the predetermined storage characteristic and may include actual free blocks within the spare blocks of the respective data storage device.

In some aspects, each controller may be configured to determine the respective number of spare blocks within the respective data storage device by subtracting the minimum number of blocks of the respective data storage device and the respective number of bad blocks within the respective data storage device from a respective number of total blocks within the respective data storage device. The respective number of total blocks within the respective data storage device may be same as a respective number of total blocks within each of other data storage devices of the plurality of data storage devices.

In some aspects, the minimum number of blocks of the respective data storage device for supporting the predetermined storage characteristic may be same as a minimum number of blocks of each of other data storage devices of the plurality of data storage devices for supporting the predetermined storage characteristic.

In some aspects, at least one data storage device of the plurality of data storage devices may include a different number of bad blocks when compared to another data storage device of the plurality of data storage devices.

In some aspects, the predetermined storage characteristic may be storage capacity for each data storage device.

In some aspects, each data storage device may have a same number of dies and may be of a same type of memory.

In some aspects, the respective number of bad blocks within the respective data storage device corresponds to a number of bad blocks across all dies within the respective data storage device.

In some aspects, the system may include a host interface for coupling the plurality of data storage devices to a host system. Each data storage device may be configured to store data corresponding to a same workload received from the host system.

In other aspects, methods are provided for minimizing performance variance in data storage devices. According to some aspects, a method may be implemented using one or more controllers for one or more data storage devices. The method may include obtaining a minimum number of blocks of a respective data storage device of a plurality of data storage devices for supporting a predetermined storage characteristic. Each data storage device may have a same storage capacity. Each data storage device may include a corresponding number of bad blocks. The method may also include calculating a respective number of spare blocks based on a respective number of bad blocks within the respective data storage device. The method may also include performing relocation for the respective data storage device based on the minimum number of blocks. The method may also include performing operations, which are not relocation, for the respective data storage device, based on the minimum number of blocks and the respective number of spare blocks.

In some aspects, the method may further include determining a respective number of illusory free blocks within the respective data storage device. The method include, in accordance with a determination that the respective number of illusory free blocks meets a respective threshold, triggering the relocation for the respective data storage device. The blocks of the respective data storage device for supporting the predetermined storage characteristic may be configured to be used for data storage. The illusory free blocks may be configured to be used for data storage. The spare blocks may be configured to be used for data storage. The bad blocks may not be usable for data storage. The illusory free blocks may exclude the spare blocks and the bad blocks. The illusory free blocks may be based on the blocks of the respective data storage device for supporting the predetermined storage characteristic.

In some aspects, the illusory free blocks within the respective data storage device may include actual free blocks within the blocks of the respective data storage device for supporting the predetermined storage characteristic and may exclude actual free blocks within the spare blocks of the respective data storage device.

In some aspects, the method may include determining the respective number of illusory free blocks within the respective data storage device by subtracting the respective number of spare blocks within the respective data storage device from a respective number of actual free blocks within the respective data storage device. The actual free blocks within the respective data storage device may include actual free blocks within the blocks of the respective data storage device for supporting the predetermined storage characteristic and may include actual free blocks within the spare blocks of the respective data storage device.

In some aspects, the method may further include performing the operations, which are not relocation, for the respective data storage device using actual free blocks within the respective data storage device. The actual free blocks within the respective data storage device may include actual free blocks within the blocks of the respective data storage device for supporting the predetermined storage characteristic and may include actual free blocks within the spare blocks of the respective data storage device.

In some aspects, the method may further include determining the respective number of spare blocks within the respective data storage device by subtracting the minimum number of blocks of the respective data storage device and the respective number of bad blocks within the respective data storage device from a respective number of total blocks within the respective data storage device. The respective number of total blocks within the respective data storage device may be same as a respective number of total blocks within each of other data storage devices of the plurality of data storage devices.

In some aspects, the minimum number of blocks of the respective data storage device for supporting the predetermined storage characteristic is same as a minimum number of blocks of each of other data storage devices of the plurality of data storage devices for supporting the predetermined storage characteristic.

In further aspects, a system may include a means for obtaining a minimum number of blocks of a respective data storage device of a plurality of data storage devices for supporting a predetermined storage characteristic. Each data storage device may have a same storage capacity, and each data storage device may include a corresponding number of bad blocks. The system may also include a means for calculating a respective number of spare blocks based on a respective number of bad blocks within the respective data storage device. The system may also include a means for performing relocation for the respective data storage device based on the minimum number of blocks. The system may also include a means for performing operations, which are not relocation, for the respective data storage device, based on the minimum number of blocks and the respective number of spare blocks.

Disclosed are systems and methods providing efficient use of free space in data storage devices and endurance benefits while minimizing device-to-device performance variance. Thus, the described methods and systems provide performance benefits that improve the functioning of a storage device.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage apparatus, comprising:
   a plurality of data storage devices, each data storage device having a same storage capacity, and each data storage device including a corresponding number of bad blocks; and
   a plurality of controllers, each controller corresponding to a respective data storage device, and each controller configured to:
      obtain a minimum number of blocks of the respective data storage device for supporting a predetermined storage characteristic;

calculate a respective number of spare blocks based on a respective number of bad blocks within the respective data storage device;
perform relocation for the respective data storage device based on the minimum number of blocks; and
perform operations, which are not relocation, for the respective data storage device, based on the minimum number of blocks and the respective number of spare blocks,
wherein each controller is configured to:
determine a respective number of illusory free blocks within the respective data storage device; and
in accordance with a determination that the respective number of illusory free blocks meets a respective threshold, trigger the relocation for the respective data storage device,
wherein:
the blocks of the respective data storage device for supporting the predetermined storage characteristic are configured to be used for data storage;
the illusory free blocks are configured to be used for data storage;
the spare blocks are configured to be used for data storage;
bad blocks are not usable for data storage;
the illusory free blocks exclude the spare blocks and bad blocks; and
the illusory free blocks are based on the blocks of the respective data storage device for supporting the predetermined storage characteristic.

2. The data storage apparatus of claim 1, wherein the illusory free blocks within the respective data storage device include actual free blocks within the blocks of the respective data storage device for supporting the predetermined storage characteristic and exclude actual free blocks within the spare blocks of the respective data storage device.

3. The data storage apparatus of claim 1,
wherein each controller is configured to determine the respective number of illusory free blocks within the respective data storage device by subtracting the respective number of spare blocks within the respective data storage device from a respective number of actual free blocks within the respective data storage device, and
wherein the actual free blocks within the respective data storage device include actual free blocks within the blocks of the respective data storage device for supporting the predetermined storage characteristic and include actual free blocks within the spare blocks of the respective data storage device.

4. The data storage apparatus of claim 1,
wherein each controller is configured to perform the operations, which are not relocation, for the respective data storage device using actual free blocks within the respective data storage device, and
wherein the actual free blocks within the respective data storage device include actual free blocks within the blocks of the respective data storage device for supporting the predetermined storage characteristic and include actual free blocks within the spare blocks of the respective data storage device.

5. The data storage apparatus of claim 1,
wherein each controller is configured to determine the respective number of spare blocks within the respective data storage device by subtracting the minimum number of blocks of the respective data storage device and the respective number of bad blocks within the respective data storage device from a respective number of total blocks within the respective data storage device, and
wherein the respective number of total blocks within the respective data storage device is same as a respective number of total blocks within each of other data storage devices of the plurality of data storage devices.

6. The data storage apparatus of claim 1, wherein the minimum number of blocks of the respective data storage device for supporting the predetermined storage characteristic is same as a minimum number of blocks of each of other data storage devices of the plurality of data storage devices for supporting the predetermined storage characteristic.

7. The data storage apparatus of claim 1, wherein at least one data storage device of the plurality of data storage devices includes a different number of bad blocks when compared to another data storage device of the plurality of data storage devices.

8. The data storage apparatus of claim 1, wherein the predetermined storage characteristic is storage capacity for each data storage device.

9. The data storage apparatus of claim 1, wherein each data storage device has a same number of dies and is of a same type of memory.

10. The data storage apparatus of claim 1, wherein the respective number of bad blocks within the respective data storage device corresponds to a number of bad blocks across all dies within the respective data storage device.

11. The data storage apparatus of claim 1, further comprising:
a host interface for coupling the plurality of data storage devices to a host system;
wherein each data storage device is configured to store data corresponding to a same workload received from the host system.

12. A method implemented using one or more controllers for one or more data storage devices, the method comprising:
obtaining a minimum number of blocks of a respective data storage device of a plurality of data storage devices for supporting a predetermined storage characteristic, wherein each data storage device has a same storage capacity, and wherein each data storage device includes a corresponding number of bad blocks;
calculating a respective number of spare blocks based on a respective number of bad blocks within the respective data storage device;
performing relocation for the respective data storage device based on the minimum number of blocks; and
performing operations, which are not relocation, for the respective data storage device, based on the minimum number of blocks and the respective number of spare blocks,
wherein the method further comprises:
determining a respective number of illusory free blocks within the respective data storage device; and
in accordance with a determination that the respective number of illusory free blocks meets a respective threshold, triggering the relocation for the respective data storage device.

13. The method of claim 12,
wherein:
the blocks of the respective data storage device for supporting the predetermined storage characteristic are configured to be used for data storage;
the illusory free blocks are configured to be used for data storage;

the spare blocks are configured to be used for data storage;

bad blocks are not usable for data storage;

the illusory free blocks exclude the spare blocks and bad blocks; and the illusory free blocks are based on the blocks of the respective data storage device for supporting the predetermined storage characteristic.

14. The method of claim 13, wherein the illusory free blocks within the respective data storage device include actual free blocks within the blocks of the respective data storage device for supporting the predetermined storage characteristic and exclude actual free blocks within the spare blocks of the respective data storage device.

15. The method of claim 13, further comprising:

determining the respective number of illusory free blocks within the respective data storage device by subtracting the respective number of spare blocks within the respective data storage device from a respective number of actual free blocks within the respective data storage device, wherein the actual free blocks within the respective data storage device include actual free blocks within the blocks of the respective data storage device for supporting the predetermined storage characteristic and include actual free blocks within the spare blocks of the respective data storage device.

16. The method of claim 12, further comprising:

performing the operations, which are not relocation, for the respective data storage device using actual free blocks within the respective data storage device, and wherein the actual free blocks within the respective data storage device include actual free blocks within the blocks of the respective data storage device for supporting the predetermined storage characteristic and include actual free blocks within the spare blocks of the respective data storage device.

17. The method of claim 12, further comprising:

determining the respective number of spare blocks within the respective data storage device by subtracting the minimum number of blocks of the respective data storage device and the respective number of bad blocks within the respective data storage device from a respective number of total blocks within the respective data storage device, wherein the respective number of total blocks within the respective data storage device is same as a respective number of total blocks within each of other data storage devices of the plurality of data storage devices.

18. The method of claim 12, wherein the minimum number of blocks of the respective data storage device for supporting the predetermined storage characteristic is same as a minimum number of blocks of each of other data storage devices of the plurality of data storage devices for supporting the predetermined storage characteristic.

19. A system, comprising:

means for obtaining a minimum number of blocks of a respective data storage device of a plurality of data storage devices for supporting a predetermined storage characteristic, wherein each data storage device has a same storage capacity, and wherein each data storage device includes a corresponding number of bad blocks;

means for calculating a respective number of spare blocks based on a respective number of bad blocks within the respective data storage device;

means for performing relocation for the respective data storage device based on the minimum number of blocks; and means for performing operations, which are not relocation, for the respective data storage device, based on the minimum number of blocks and the respective number of spare blocks, wherein the system further comprises:

means for determining a respective number of illusory free blocks within the respective data storage device; and means for, in accordance with a determination that the respective number of illusory free blocks meets a respective threshold, triggering the relocation for the respective data storage device.

* * * * *